June 22, 1965  M. TICOIAN  3,190,211
PORTABLE CULINARY STOVE
Filed Jan. 2, 1964  2 Sheets-Sheet 2

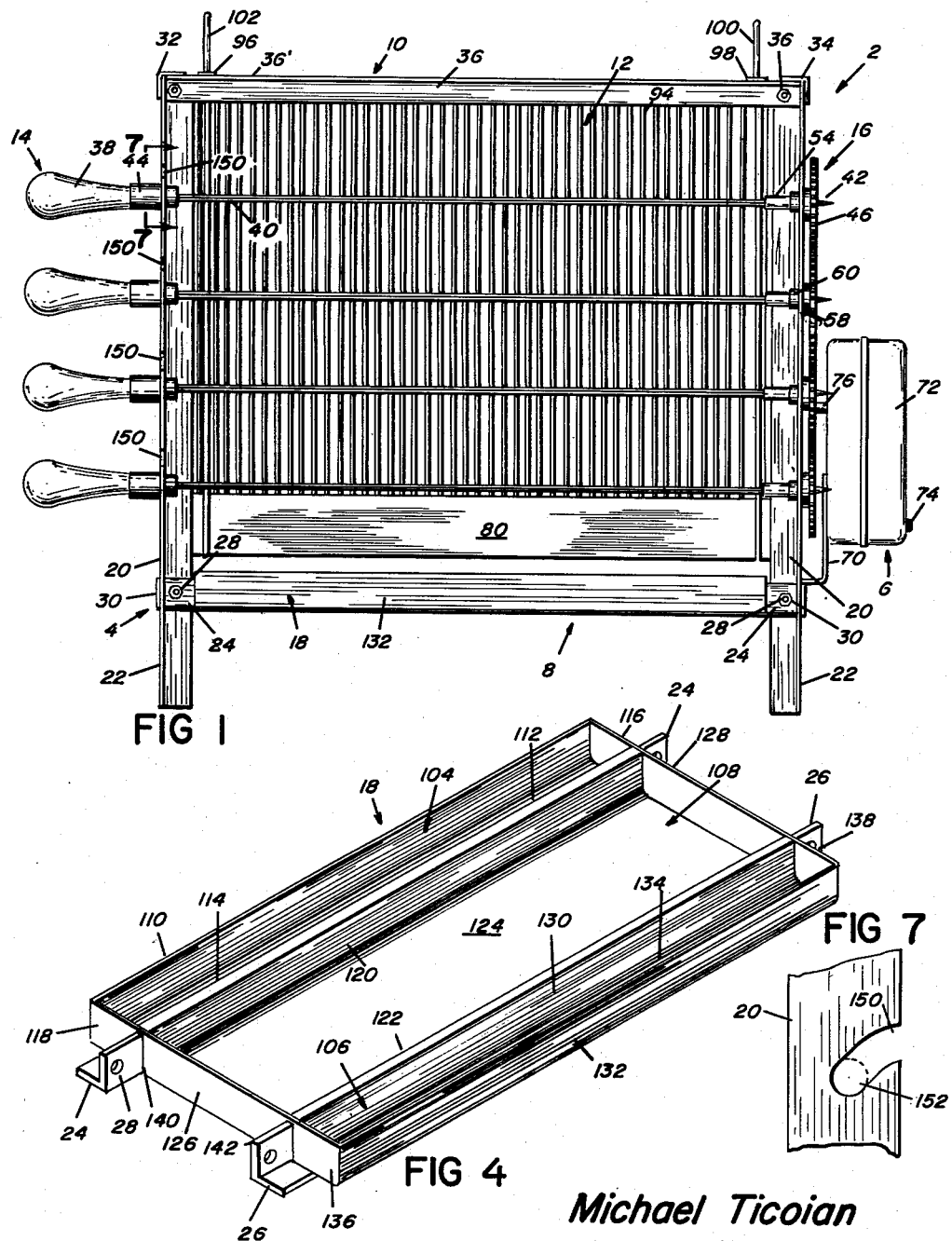

Michael Ticoian
INVENTOR

BY Jacobi & Davidson
ATTORNEYS

United States Patent Office 3,190,211
Patented June 22, 1965

3,190,211
PORTABLE CULINARY STOVE
Michael Ticoian, 2339 Ashmead Place NW.,
Washington, D.C.
Filed Jan. 2, 1964, Ser. No. 335,131
3 Claims. (Cl. 99—421)

This invention relates generally to a cooking apparatus and more specifically to a portable culinary stove in which comestibles are revolved adjacent a heating unit. Such apparatus is commonly referred to as a rotisserie.

Various types of rotisseries have previously been developed, and generally, they have utilized a rotating support upon which the food article is secured and a heating means disposed below the rotating support. In these types of devices drippings from the food article falling onto the heating means such as a heated coil or burning charcoal, result in an instant flame having a burning heat which sears the food article but fails to evenly cook the same. Other devices have used an overhead heating unit such as a heated coil but such devices are limited in the number of rotary supports which can be provided. Furthermore, these types of rotisseries are so constructed that a food article of any substantial size cannot be accommodated due to the generally limited vertical spacing between the heating element and the rotational axis of the food supporting member.

Accordingly, a primary object of the present invention is to provide an apparatus of the general type which overcomes the above noted disadvantages and which further permits an even controlled cooking of a large volume of comestibles by lateral radiation of heat from a vertically disposed heating area adjacent the rotating comestibles.

Another primary object of the present invention is the cooking of comestibles in the manner heretofore described and which cooking is carried out substantially free of undesirable smoke and odors which result from the contact between a heating element such as charcoal and the drippings of fat from comestibles such as meat.

A further primary object of the present invention is the provision of a rotisserie unit constructed in the preferred manner and in which a plurality of rotating food supporting members are mounted for rotation laterally of the major heating surface of a burning area thereby providing even cooking of the food article so disposed.

Another object of the present invention is to provide a rotisserie apparatus constructed in the preferred manner and including vertically spaced oppositely aligned pairs of rotating spits or skewers supported laterally of a central fuel receiving area.

A further object of the present invention is the provision of a rotisserie apparatus constructed in the preferred manner and further including a power means for rotating a plurality of food supporting spits, pins or skewers. A further object of the present invention is to provide such a power means which can either be operated through a connection to a conventional household electrical outlet or on battery power. In this manner, the apparatus of the present invention may be utilized in outdoor areas where electrical connections are not available.

A further object of the present invention is to provide a cooking unit which permits simultaneous rotation of a plurality of pins or skewers upon which are mounted or secured food articles such as meat and which unit evenly cooks the food particles by lateral radiation of heat from an area between the vertically spaced and opposed pairs of rotating spits or skewers and thereby preventing drippings from said food particles from coming in contact with the heating element and thereby causing a flame which tends to burn the food article. Another further object of the present invention is the provision of a rotisserie apparatus constructed in the preferred manner and including a drip pan attachment disposed below the heating unit as well as the rotating skewers for catching and containing the drippings from the food articles being cooked as well as the fly ash from the heating unit.

Aside from the foregoing more basic general and specific objects of the invention, there are certain additional objects hereof, which are significant. These additional objects include:

(a) the provision of a culinary stove having a frame which includes a base section and a plurality of upstanding support members surrounding a fuel receiving chamber which is removably disposed therebetween and which support members are provided with suitable recesses and slots therein for accepting the engagement of the vertically spaced horizontally disposed rotating skewers;

(b) the provision of a culinary stove having a plurality of vertically spaced rotating skewers on each side thereof and which skewers are simultaneously rotated by means of a power source mounted on the frame of the culinary stove;

(c) the provision of a culinary stove having a frame comprising a plurality of upstanding support members defining a rectangular opening therebetween for accepting a fuel receiving chamber in the medial section thereof and about which are disposed a plurality of vertically spaced rotating skewers on each side thereof and which skewers are simultaneously rotated about their longitudinal axes by means of interengaging drive mechanism driven by a power source mounted on the frame of the culinary stove;

(d) the provision of a culinary stove for use with a heating material such as charcoal or what is commonly known as briquettes for the cooking and/or barbecuing of comestibles supported on a plurality of simultaneously rotating skewers driven by a power means mounted on the frame of the culinary stove and which rotating skewers are disposed in vertically spaced relation on opposite sides of the heating material located in a chamber therebetween;

(e) the provision of a culinary stove which is relatively light in weight, and capable of being transported from place to place, for use indoors or outdoors and capable of operating on different types of power sources for rotating the plurality of comestible supporting skewers;

(f) the provision of a culinary stove in which the supporting frame may be manufactured from conventional stock and which can be assembled quickly and inexpensively thereby reducing the manufacturing costs to a minimum.

The invention resides in the combination and arrangement and disposition of the various components of a culinary stove constructed in accordance herewith, and particularly in the power and driving components thereof. The invention will be better understood, and objects other than those specifically set forth above will become apparent, when consideration is given to the following detailed description. Such description refers to the annexed drawings presenting a preferred and illustrative embodiment of the invention.

In the drawings:

FIGURE 1 is a side elevational view of a culinary stove constructed in accordance with the present invention;

FIGURE 4 is a perspective view of the drip pan used in conjunction with the culinary stove shown in FIGURES 1 and 2;

FIGURE 7 is a fragmental front elevation of a frame member and an associated engaging arrangement for the rotatable skewers.

Figure 5:
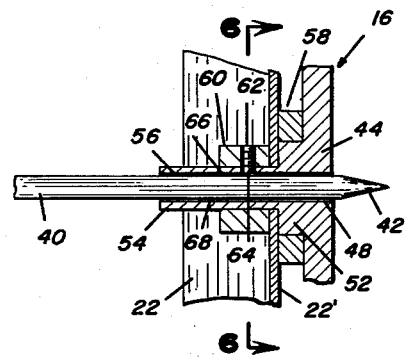
FIGURE 5 is a fragmental longitudinal sectional view of one of the drive mechanisms of the culinary stove shown in FIGURE 1 and taken along the line 5—5 of FIGURE 2.

By referring to FIGURE 1, it will be noted that the culinary stove shown therein is generally designated by the numeral 2. Such stove comprises an upstanding frame means 4 having a power means 6 mounted thereon and a base portion 8 at the lower end thereof. The upper end of the support frame 4 includes an upper supporting arrangement 10 upon which the fuel receiving chamber 12 is supported.

Figure 2:
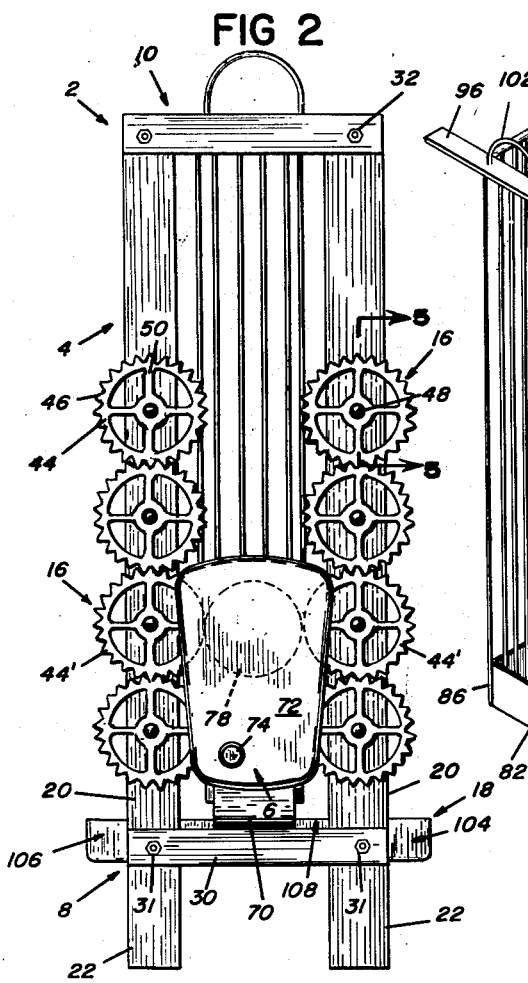
FIGURE 2 is an end elevational view of the culinary stove shown in FIGURE 1, FIGURE 2 having been taken from the end of the culinary stove upon which the power and driving mechanisms are mounted.

A plurality of food supporting pins or skewers 14 are releasably and rotatably supported on both sides of the upstanding frame 4 as shown in FIGURE 2. Associated with each of the pins or skewers 14 is a separate drive means 16 rotatably mounted on the upstanding frame 4 which also supports a drip pan 18 on the base portion 8 thereof.

The upstanding support frame 4 includes four angle members 20 the lower ends of which comprise supporting legs 22 for supporting the culinary stove 2 on a surface. Spaced above the leg portions 22 of the frame are a pair of longitudinally extending angle members 24 and 26 having apertures 28 on the outer ends thereof and suitable fastening means for securing the same to the upstanding angle members 20. At each end of the frame 4 and disposed along the same horizontal plane as the longitudinally extending angles 24 and 26 are supporting cross members 30 having apertures 31 and suitable fastening means thereon for securing the same to the upstanding angle members 20. The upper supporting portion 10 of the frame 4 includes the transverse angle members 32 and 34 at opposite ends of the frame, joining the leg members 20 together at the top ends thereof. Extending longitudinally between the leg members 20 on opposite sides of the frame are a pair of angle members 36 which are secured by means of conventional fastening means such as bolts and nuts or rivets 36.

From the previous description of the culinary stove and its associated frame structure described therein, it should be apparent that the frame is of such a rigid construction as to enable the user to support the same on any type of surface and to use the stove with varying amounts of and differing weights of food articles on the rotating skewer members as well as supporting sufficient amount of heating material in the fuel receiving chamber to be described below.

Figure 6:
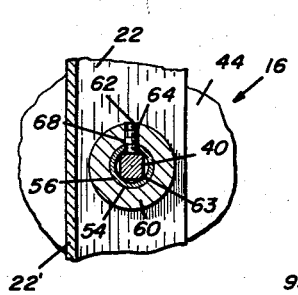
FIGURE 6 is a fragmental sectional view taken along the line 6—6 of FIGURE 5.

By referring to FIGURES 1 and 2 it will be noted that the skewers 14 comprise a handle portion 38, a shaft 40 having a pointed end 42 and a securing member 44 for attaching the shaft to the handle portion. Since each of the skewers 14 are constructed in a similar manner, a description of only one of the skewer members should suffice for purposes of explanation and description herein. In order to more efficiently rotate the skewers 14 by means of the driving mechanism 16, the shafts 40 are generally rectangular in shape as shown in FIGURE 6. However, it should be apparent that any other type of shaft could be used in conjunction with the culinary stove of the present invention.

The upstanding angle members 20 at one end of the frame 2 rotatably support the driving means 16 for each of the skewers 14. As is seen in FIGURE 2, the driving means 16 includes a sprocket wheel 44 having teeth 46 around the entire periphery thereof and a bore 48 in the central portion supported by the outwardly extending rungs 50 connected to the peripheral teeth on the sprocket wheel 44.

As seen in FIGURE 5, each of the sprocket wheels 44 is integrally connected with a reduced bearing portion 52 which abuts against the outwardly extending flange 22′ of the upstanding angle 20 and further includes the inwardly projecting stub shaft 54 having a bore 56 in the same horizontal plane as the outer bore 48 therein for engaging the pointed end 42 of the skewer shaft 40. A washer 58 is supported about the bearing portion 52 and disposed between the sprocket wheel 44 and the flange 22′ thereby allowing free rotation of the sprocket wheel 44 on the upstanding support member or angle 20. In this manner, the driving mechanisms are maintained free from binding with the support member upon which they are journaled.

As seen in FIGURE 5 as well as FIGURE 6, the stub shaft 54 supports a circular collar 60 thereon which collar has an aperture 62 therein extending from the peripheral outer surface of the collar to the inner bore 63 thereof. A similar aperture 68 is disposed in the stub shaft 54 which aperture extends from the outer peripheral surface of the shaft 54 to the inner bore 56 thereof. By means of a set screw 64 threadably engaging the collar 60 and the stub shaft 54 each of the shafts 40 of the skewers 14 are maintained in tight adjustable engagement with the driving sprocket gear 44. Furthermore, by means of the set screws 64 it is possible to use skewers having varying sizes of shafts so long as the diameter or width thereof do not exceed the maximum allowable space defined by the bore 56 in the stub shaft 54.

As clearly shown in FIGURE 2, and as more fully explained above, the individual sprocket gears 44 associated with each of the skewers 14 is supported on one of the opposite upstanding members or angles 20 in vertically spaced relation to each of the other sprocket gears. These sprocket gears 44 are so disposed as to permit the engagement of the teeth 46 thereon with at least one other sprocket gear supported on the same upstanding member 20. By means of this mating relation of the teeth on the sprocket gears, it is possible to render simultaneous rotating movement to the various skewers on the one side of the fuel receiving chamber 12 as well as simultaneous movement to the skewers on the other side thereof.

In order to simultaneously rotate the various sprocket gears associated with each skewer on both sides of the frame, a power source 6 is provided. As seen in FIGURE 1, an angular support member 70 is fixed to the transverse member 30 on the lower end of the frame. Upon this support member 70 is mounted the power source 6. This power source 6 comprises a conventional motor and gearing arrangement enclosed by a casing 72 and further includes a switch 74 for turning the motor on and off. As previously stated above, this power source is of the type which can either be battery operated or connected to an outlet for house current. Extending outwardly from the motor casing 72 is a shaft 76 shown in FIGURE 2 and upon which is supported a centrally disposed auxiliary or driving sprocket wheel 78 for engaging a pair of sprocket wheels 44′ disposed on each side thereof. Through this arrangement it is possible to simultaneously drive each of the sprocket wheels 44 and the associated skewers therewith on each side of the frame 4 by merely imparting rotating motion to one of the sprocket wheels 44 on each side of the frame. The vertical placement of the auxiliary or driving sprocket wheel 78 and the power source 6 is not critical since the sprocket wheels 44 on each side of the frame are inter-engaged with one another thereby permitting the auxiliary or driving sprocket wheel to engage any one of the sprocket gears on each side of the frame and thereby rotate all of the sprocket wheels 44.

Figure 3:
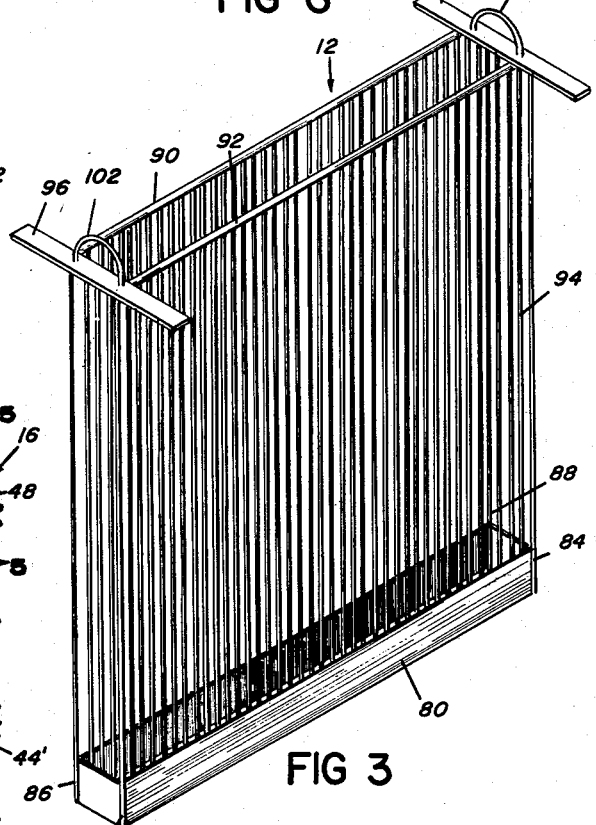
FIGURE 3 is a perspective view of the fuel receiving chamber used in conjunction with the culinary stove shown in FIGURES 1 and 2 and constructed in accordance with the present invention.

Now, if reference is made to FIGURE 3, it will be noted that the fuel receiving chamber 12 comprises a base portion 80 supporting a plurality of upstanding corner rod members 82, 84, 86 and 88 thereon. These corner rod members extend upwardly to the top of the fuel receiving chamber where the rods 82 and 84 are supported by a longitudinally extending bar member 92 and the rods 84 and 86 are supported by the bar member 90. The vertical faces of the fuel receiving chamber, as seen in FIGURE 3, comprise a plurality of vertically extending rod members 94 laterally spaced from each other thereby permitting a free flow of air throughout the entire fuel receiving chamber. The bottom surface of the chamber also contains longitudinally spaced apart rod members secured to the base portion 80 thereof. Secured to the longitudinally horizontally disposed bar members 90 and 92 and extending transversely of the fuel receiving chamber are a pair of retaining brackets 96 and 98, one at each end of the fuel receiving chamber. Handles 100 and 102, respectively, are attached to a different one of the retaining brackets for permitting easy placement and removability of the chamber with respect to the frame. These retaining brackets engage the upper flange 36' on each side of the frame 4 when the fuel receiving chamber is disposed within the stove, as shown in FIGURE 1.

As seen in FIGURE 1, the fuel receiving chamber 12 is confined between the vertically spaced apart and aligned skewers 14 on each side of the frame and is spaced upwardly from the drip pan 18 removably supported by the base portion of the frame. In operation, the user would normally fill the fuel receiving chamber with charcoal, briquettes or other conventional burning matter and then insert the same within the confines of the frame by merely lowering the chamber into the frame by means of the handles 100 and 102. Because of the spacing between the vertically disposed rods 94 the heat generated by the charcoal or other burning matter in the fuel receiving chamber radiates laterally therefrom, through the spaces between the rods, and evenly cooks the food articles supported and rotated on the skewers. As previously described, the drippings from the cooking food articles will fall into the drip pan 18 rather than into the burning coals. In this way the food articles are only cooked by the radiant heat from the burning coals rather than by direct contact with a hot flame created in conventional rotisseries by the drippings coming in contact with the burning coals.

If required, the user may add fuel to the chamber by merely dropping the same into and through the top thereof without removing it from the stove during a cooking operation.

As is well known by those who have used conventional charcoal cooking stoves, the cooking of meats or other foods articles on rotating skewers results in drippings from the food articles and also from the fuel chamber wherein the burning material usually produces a fly ash dropping therefrom. In order to efficiently retain these drippings and preventing the same from falling on the surface upon which the stove may rest, the present invention includes a removable drip pan 18 shown in FIGURE 4. This drip pan includes a pair of outwardly disposed U-shaped sections 104 and 106 and a central U-shaped section 108. The outer section 104 includes an outer upstanding wall 110, a curved bottom portion 112 which terminates in an opposite upstanding wall 114, and a pair of end members 116 and 118 extending between the walls 110 and 114. This outer section 104 lies under the rotating skewers on the right side of the frame as seen in FIGURE 2 and receives the drippings from the food articles supported on these skewers. The center section 108 of the drip pan 18 also includes a pair of spaced apart upstanding walls 120 and 122, a bottom portion 124, and opposed end walls 126 and 128. This center section 108 lies below the fuel receiving chamber 12 and receives any ash or other material which may fall therefrom. The outermost section 106 of the drip pan 18 also includes upstanding walls 130 and 132, a bottom portion 134, and opposed end walls 136 and 138. This portion 106 of the drip pan 18 lies below the skewers on the left side of the frame as seen in FIGURE 2.

In order to render the drip pan 18 removable from the frame for cleaning purposes, a pair of recesses 140 and 142 are provided between the outer pans 104 and 106 and the central pan portion 108 thereof. These U-shaped recesses ovelie the longitudinally extending angle members 24 and 26 previously described in connection with the support frame 4 of the culinary stove 2. In this manner, the drip pan 18 may be readily removed from the frame by lifting the pan to disengage the same from the angle members 24 and 26.

In order to provide easy removability of the skewers from the support frame and their respective driving elements, a plurality of slots 150 ar elocated on the flanges of the upstanding angle members 20 at the end of the frame opposite the motor mounting. FIGURE 7 shows a portion of one of the angle members 20 containing a slot 150. These slots 150 are of such a size which permits the free passage of the shaft 40 of the skewers therethrough. The slot 150 terminates inwardly of the outer edge of the flange in a recess portion 152 which is circular in shape and thereby permits free rotation of the skewers therein. As seen in FIGURE 1, each of the upstanding angle or support members 20 at the left end of the frame is provided with a plurality of the slots 150 and recesses 152.

It should be noted, however, that each cooperating slot 150 and recess 152 in which a skewer 14 is supported permits the insertion and removability of individual skewers without interference with the operation of any other skewers. In other words, the user may insert or remove any number of skewers while the device remains in operation.

Having now described the invention in considerable details, it will be appreciated that the objects set forth at the outset of the present specification have been satisfactorily achieved.

Accordingly, what is claimed is:

1. A portable culinary stove of the type using charcoal for fuel, said stove comprising:
   a support frame including a first pair of spaced apart substantially coplanar upstanding support legs and a second pair of spaced apart substantially coplanar upstanding support legs, with the plane of said second pair being substantially parallel to the plane of said first pair;
   said support frame further including transverse connecting members extending between the legs of each pair adjacent the upper end and the lower end thereof;
   said support frame still further including longitudinal connecting members extending between one leg in said first pair and its aligned leg in said second pair adjacent the upper and the lower ends thereof;
   a plurality of aligned sprocket wheels mounted upon each leg of said second pair with each of said sprocket wheels meshing with each wheel adjacent to it in said alignment;
   each of said sprocket wheels having a projecting hollow stub shaft passing through said second pair of legs and extending toward said first pair of legs;
   motor means secured to said support frame adjacent said second pair of legs;
   said motor means including a driven auxiliary sprocket wheel disposed between said legs in said second pair and interengaging a sprocket wheel on each of said legs, whereby operation of said motor means to rotate said auxiliary sprocket wheel will in turn rotate each of the aligned sprocket wheels on each of said legs;

each leg in said first pair having a plurality of slots extending from one edge thereof and merging downward into a recess;

each of said recesses being substantially longitudinally aligned with one of said sprocket wheel stub shafts;

a plurality of skewers adapted to support items to be cooked in the stove;

each of said skewers having a pointed end and a handle end;

each skewer being disposed within said stove with its pointed end disposed within a selected hollow stub shaft, with its handle end projecting outwardly beyond said first pair of legs, and with a portion between said ends being freely supported within the recess aligned with said selected stub shaft;

a charcoal receiving receptacle disposed centrally within said stove between said legs;

said receptacle including a base portion, a pair of upstanding longitudinally extending side walls, a pair of transverse supporting bars extending between and beyond said side walls at the top ends thereof, and handle means secured to said transverse supporting bars;

said receptacle being removably mounted within said stove by supporting said receptacle within said support frame with said transverse supporting bars abutting against said upper longitudinal connecting members;

said skewers and said receptacle being cooperatively disposed with said skewers being located adjacent the side walls of said receptacle whereby heat radiating from said charcoal within said receptacle will cook said items on said skewers as said skewers are rotated by their respective sprocket wheels;

said skewers being completely removable from said stove to remove cooked items therefrom and to replace uncooked items thereon;

said receptacle being removable from said stove by lifting the same by its handle means, and such removal being manageable without removal of said skewers.

2. A portable culinary stove as defined in claim 1 wherein said receptacle side walls are formed by a series of spaced rod members which permit free passage of air through said receptacle.

3. A portable culinary stove as defined in claim 1 wherein a panel extends between said lower transverse and longitudinal connecting members to serve as a drip pan for catching falling ash from said receptacle and drippings from the items cooking on said skewers.

References Cited by the Examiner

UNITED STATES PATENTS

| | | | |
|---|---|---|---|
| 2,314,772 | 3/43 | Corra | 126—14 |
| 2,485,890 | 10/49 | Keljik | 99—421 |
| 2,588,091 | 3/52 | Dornbush | 99—421 |
| 2,590,470 | 3/52 | Skocic | 99—421 |
| 2,638,888 | 5/53 | Molla | 125—25 |
| 2,734,499 | 2/56 | Lombardi | 99—339 |
| 2,946,275 | 7/60 | Compton | 99—390 |

FOREIGN PATENTS 701,952   1/54   Great Britain.

ROBERT E. PULFREY, *Primary Examiner.*

LAWRENCE CHARLES, *Examiner.*